US010990436B2

(12) United States Patent
Iyer (10) Patent No.: US 10,990,436 B2
(45) Date of Patent: Apr. 27, 2021

(54) SYSTEM AND METHOD TO HANDLE I/O PAGE FAULTS IN AN I/O MEMORY MANAGEMENT UNIT

(71) Applicant: DELL PRODUCTS, LP, Round Rock, TX (US)

(72) Inventor: Shyamkumar T. Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/673,358

(22) Filed: Nov. 4, 2019

(65) Prior Publication Data

US 2020/0065134 A1 Feb. 27, 2020

Related U.S. Application Data

(63) Continuation-in-part of application No. 15/879,080, filed on Jan. 24, 2018, now abandoned.

(51) Int. Cl.
| | |
|---|---|
| *G06F 9/455* | (2018.01) |
| *G06F 12/1009* | (2016.01) |
| *G06F 9/48* | (2006.01) |
| *G06F 9/46* | (2006.01) |
| *G06F 9/54* | (2006.01) |
| *G06F 9/30* | (2018.01) |

(52) U.S. Cl.
CPC ...... *G06F 9/45558* (2013.01); *G06F 9/30098* (2013.01); *G06F 9/467* (2013.01); *G06F 9/4812* (2013.01); *G06F 9/546* (2013.01); *G06F 12/1009* (2013.01); *G06F 2009/45579* (2013.01)

(58) Field of Classification Search
CPC .. G06F 9/45558; G06F 9/30098; G06F 9/467; G06F 9/4812; G06F 9/546; G06F 12/1009; G06F 12/1081; G06F 12/0292; G06F 12/10; G06F 2009/45579
See application file for complete search history.

(56) References Cited

U.S. PATENT DOCUMENTS

| | | | | |
|---|---|---|---|---|
| 7,849,287 B2 * | 12/2010 | Hummel | ............. | G06F 12/0284 711/206 |
| 8,255,475 B2 * | 8/2012 | Kagan | ................. | G06F 12/1072 709/212 |
| 8,719,464 B2 * | 5/2014 | Kegel | ................... | G06F 12/109 710/22 |
| 8,719,543 B2 * | 5/2014 | Kaminski | ........... | G06F 12/1081 711/206 |
| 8,954,959 B2 * | 2/2015 | Tsirkin | ................ | G06F 12/1009 718/1 |
| 9,299,121 B2 * | 3/2016 | Hartog | ...................... | G06T 1/20 |
| 9,304,813 B2 * | 4/2016 | Vembu | .................. | G06F 9/4881 |
| 9,424,155 B1 * | 8/2016 | Pizel | ..................... | G06F 3/0665 |
| 9,430,391 B2 * | 8/2016 | Asaro | ................. | G06F 12/0815 |

(Continued)

*Primary Examiner* — Brian T Misiura
(74) *Attorney, Agent, or Firm* — Larson Newman, LLP (57) ABSTRACT

An information handling system includes an input/output (I/O) device and an input/output memory management unit (I/OMMU). The I/OMMU is configured to translate virtual addresses from the I/O device to physical addresses in a memory. The I/O device is configured to send a first virtual address to the I/OMMU, to receive an error indication from the I/OMMU, and to send an interrupt in response to the error indication, wherein the error indication indicates that the I/OMMU failed to translate the particular first address into a first physical address.

20 Claims, 8 Drawing Sheets

(56) References Cited

U.S. PATENT DOCUMENTS

| | | | |
|---|---|---|---|
| 9,535,849 B2 * | 1/2017 | Kegel | G06F 12/1081 |
| 9,606,936 B2 * | 3/2017 | Kegel | G06F 12/1036 |
| 9,645,854 B2 * | 5/2017 | Sander | G06T 1/20 |
| 9,916,257 B2 * | 3/2018 | Sankaran | G06F 12/1027 |
| 9,959,214 B1 | 5/2018 | Habusha et al. | |
| 2011/0022818 A1 * | 1/2011 | Kegel | G06F 12/1009 |
| | | | 711/206 |
| 2013/0031333 A1 * | 1/2013 | Sankaran | G06F 12/1027 |
| | | | 711/207 |
| 2013/0145202 A1 | 6/2013 | Hartog et al. | |
| 2019/0227942 A1 * | 7/2019 | Iyer | G06F 9/45558 |
| 2020/0065134 A1 * | 2/2020 | Iyer | G06F 9/45558 |

\* cited by examiner

FIG. 8

SYSTEM AND METHOD TO HANDLE I/O PAGE FAULTS IN AN I/O MEMORY MANAGEMENT UNIT

CROSS-REFERENCE TO RELATED APPLICATION

This application is a continuation-in-part of U.S. patent application Ser. No. 15/879,080, entitled "System and Method to Handle I/O Page Faults in an I/O Memory Management Unit," filed on Jan. 24, 2018, the disclosure of which is hereby expressly incorporated by reference in its entirety.

FIELD OF THE DISCLOSURE

This disclosure generally relates to information handling systems, and more particularly relates to handling I/O page faults in an I/O memory management unit.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include an input/output (I/O) device and an input/output memory management unit (I/OMMU). The I/OMMU may be configured to translate virtual addresses from the I/O device to physical addresses in a memory. The I/O device may be configured to send a first virtual address to the I/OMMU, to receive an error indication from the I/OMMU, and to send an interrupt in response to the error indication, wherein the error indication indicates that the I/OMMU failed to translate the particular first address into a first physical address.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
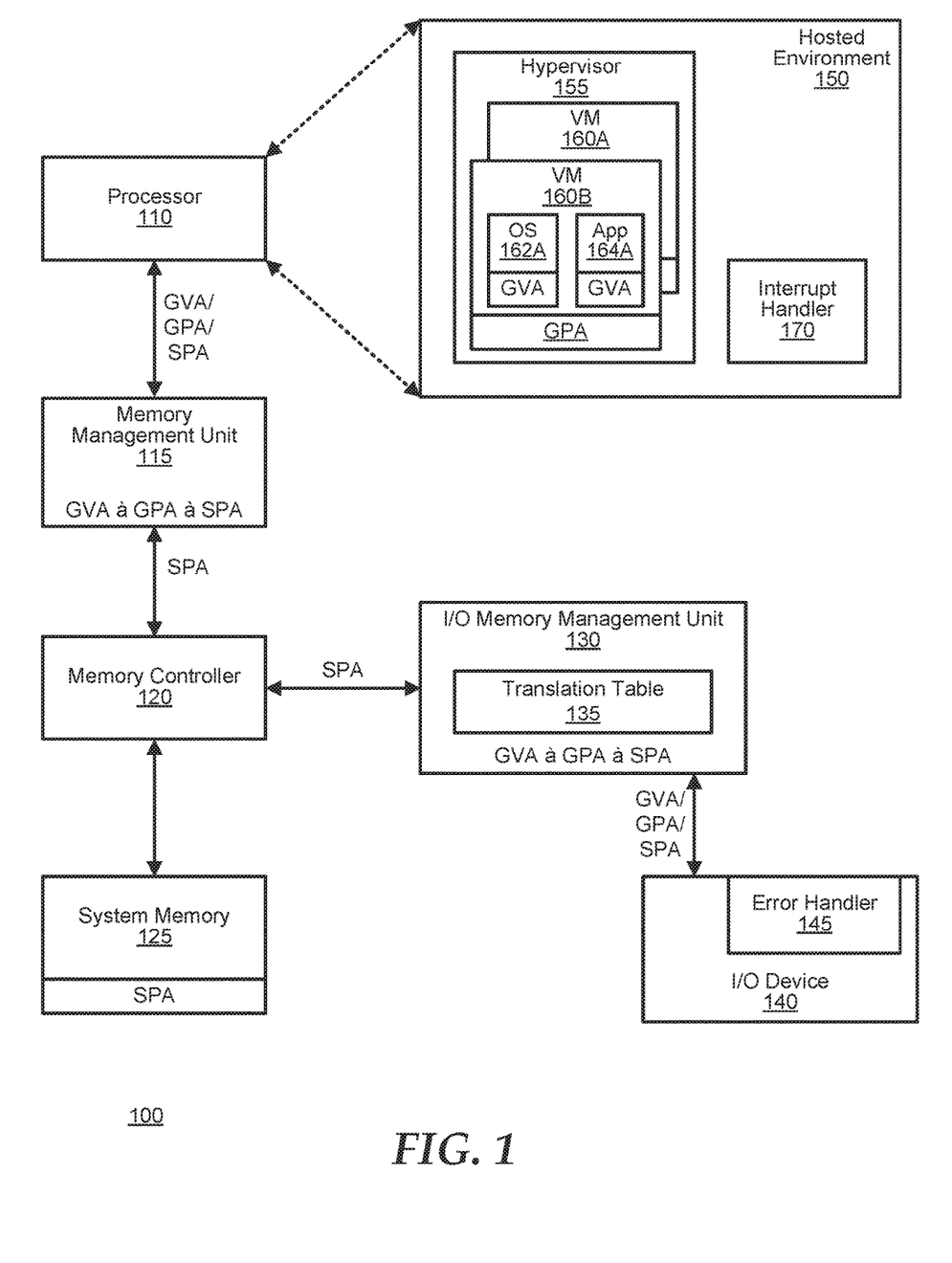
FIG. 1 is a block diagram illustrating an information handling system according to an embodiment of the present disclosure.

FIG. 1 illustrates an information handling system 100 including a processor 110, a memory management unit (MMU) 115, a memory controller 120, a system memory 125, an input/output memory management unit (I/OMMU) 130, and an I/O device 140. Processor 110 operates to execute machine-readable code to instantiate a hosted environment 150 including a hypervisor 155 and an interrupt handler 170. Hypervisor 155, also referred to as a virtual machine manager (VMM), operates on information handling system 100 to instantiate one or more virtual machines (VMs) 160A and 160B. Each VMs 160 represent segmented operating environments instantiated in code that provide the functions of an information handling system to an end user of the VM, but that utilize the hardware resources of information handling system 100. As such, VMs 160 each operate to run a virtual operating system (OS) 162 that can launch one or more applications 164. Thus, where information handling system 100 includes system memory 125 that provides a system physical address (SPA) space that is defined by the physical characteristics of the information handling system, VMs 160 each include a virtual machine physical address space, called a guest physical address (GPA) space that is defined by the configuration of the particular VM. Further, memory addressing within VMs 160, that is, within OS 162 and applications 164, may be based upon a virtual address space, called a guest virtual address (GVA) space.

Hypervisor 155 operates to manage each of VMs 160 in terms of usage and allocation of system memory 125 and I/O device 140. In particular, it will be noted that, within the confines of VMs 160, various memory and I/O operations my result in no contentions within each VMs' own the GVA space or GPA space. However, the mapping of each of VMs'

160 own GVA space and GPA space must be maintained in separate areas within SPA space of system memory 125 in order to avoid memory contentions between the VMs. As such, hypervisor 155 may operate to translate each of VMs 160 GVA- and GPA-based transaction into associated SPA-based transactions that are targeted to the separate areas of system memory 125, however, this method invokes processor 110 to perform the memory translations. In a particular embodiment, hypervisor 155 sets up and maintains a translation table in MMU 115 that permits the MMU to perform the translations between VMs' 160 GVA- and GPA-based transactions, thereby freeing processor 110 from having to perform the processing steps to do the translations. In either case, MMU 115 provides only SPA-based transactions to memory controller 120, that is, memory transactions that are addressed into the SPA space of system memory 125. The details of memory translation are known in the art and will not be further disclosed herein, except as needed to illustrate the present invention.

I/O device 140 represents a resource of information handling system 100 that are accessed via particular I/O interfaces of the information handling system, and that accesses system memory 125 perform various processing functions of the information handling system. An example of I/O device 140 may include a co-processor, such as a graphics processor, a storage controller, a network interface controller such as a converged network adapter (CNA), or another device as needed or desired. An example of an interface that may be used to access I/O device 140 may include a Peripheral Component Interconnect-Express (PCIe) interface, a Serial ATA (SATA) interface, a SCSI interface, or another interface as needed or desired. In particular, I/O device 140 operates to provide various direct memory access (DMA) operations between resources of the I/O device and system memory 125. As such, hypervisor 155, VMs 160, OS 162, application 164, or other elements of hosted environment 150 may operate to access I/O device 140 via the I/O interface to set up a processing task. The processing task may be based upon data stored in system memory 125 or may store data resulting from the processing task to the system memory, as needed or desired. After the processing task is set up, processor 110 is no longer needed to provide data processing functions to I/O device 140 in order to perform the processing task.

I/O device 140 is virtualizable, in that the resources, functions, and features of the I/O device may be allocated to VMs 160 by hypervisor 155. In particular, I/O device 140 may provide memory transactions that are associated with VMs 160, with OS 162, or with application 164. Thus, a memory transaction provided by I/O device 140 may be addressed with a GVA, with a GPA, or with a SPA. As with memory transactions from hosted environment 150, as described above, hypervisor 155 may operate to translate the GVA- and GPA-based memory transactions from I/O device 140, but with the same overhead usage of processor 110. In a particular embodiment, hypervisor 155 sets up and maintains a translation table 135 in I/OMMU 130 that permits the I/OMMU to perform the translations between the GVA- and GPA-based transactions from I/O device 140, thereby freeing processor 110 from having to perform the processing steps to do the translations. As such, I/OMMU 130 provides only SPA-based transactions to memory controller 120, that is, memory transactions that are addressed into the SPA space of system memory 125.

Typically, when hypervisor 155 instantiates one of VMs 160, the hypervisor allocates one or more portion of system memory 125 to the VM, thereby creating a GPA-to-SPA mapping, and stores the GPA-to-SPA mapping to translation table 135. Similarly, when one of VMs 160 launches OS 162 or applications 164, hypervisor 155 allocates one or more portion of the memory allocated to the VM to the OS or application, thereby creating a GVA-to-SPA mapping, and stores the GVA-to-SPA mapping to translation table 135. In a particular embodiment, when hypervisor 155 stores a GPA-to-SPA mapping or a GVA-to-SPA mapping to translation table 135, the hypervisor also pins the mapping. That is, hypervisor 155 marks the various mapping within translation table 135 as being permanent mappings. In this way, once a mapping is created, subsequent I/O device 140 initiated memory transactions will be translated to the SPA-based memory space of system memory 125, regardless of whether the memory transaction is addressed based upon a GPA or upon a GVA. This may add to the security of information handling system 100, because any I/O device 160 initiated memory transaction that are not to previously mapped translations can be assumed to be malicious because they are being targeted to unexpected regions of system memory 125. When I/OMMU 130 receives a memory transaction that uses a GPA or a GVA for which there is no mapping, the I/OMMU can indicate to hosted environment 150 that an error has occurred, and the hosted environment can take steps to reinitialize I/O device 140, to add the mapping to translation table 135, to reset I/O device 140 to rerun the processing task, or to otherwise mitigate the translation table miss. It will be noted that I/O device 140 based memory transactions that are addressed using a GPA or a GVA will need to be further marked to identify which VM the memory transactions are associated with, and hence to which portions of system memory 125 they should be targeted. The details of virtualized address translation are known in the art and will not be further discussed except as needed to illustrate the present invention.

As the use of virtualization technology has increased, and the roll and scope of operation of I/O devices have broadened, the use of pinning of all GPA- and GVA-based memory translations to translation table 135 is becoming less pervasive. Note that where all GPA- and GVA-mappings are pinned, the size of translation table 130, and the amount of processing resources needed to utilize the translation table will increase over time, as VMs are launched or halted. As such, recent developments in virtualization technology provide for unpinned GPA- and GVA-based memory translations. For example, where a virtual machine may be migrated, it may be advantageous to free up space in translation table 135 for other more permanent translations to be stored. In another example, I/OMMU 130 may have a limited number of translations that can be supported, and so, where there are more translations needed than the available number, the I/OMMU may operate to evict less used translations in favor or more recently used translations. This may particularly lead to a translation miss where I/O device 140 is a device, such as a graphics processor, that does lengthy operations on data and only seldom needs to initiate a memory transaction. In this case, the translations needed for a particular graphics operation may have been evicted when a new memory transaction is initiated. For these reasons and others, it is expected that the number of translation misses and the amount of processing overhead expended by processor 110 to resolve the misses may also rise, thus limiting the flexibility and scalability of present methods for handling translation misses.

Interrupt handler 170 represents code within hosted environment 150 that provides various interrupt service routines to handle events within information handling system 100.

When a particular event is detected, the detector issues an interrupt to processor 110, and the processor jumps code execution to the associated interrupt service routine to deal with the event. An interrupt can be provided as a software interrupt, such as a Message Signaled Interrupt-X (MSI-X) interrupt, or as a hardware interrupt on information handling system 100. The occurrence of an interrupt can further invoke a special operating mode on processor 110, such as a System Management Mode. Here, interrupt handler 170 may represent separate firmware code stored in a secure storage of information handling system 110 to prevent tampering with the interrupt handling routines of the information handling system. An example of an interrupt that can be handled by interrupt handler 170 includes the translation table miss in I/OMMU 130 as described above. Here, when I/OMMU 130 receives a memory transaction from I/O device 140 that uses a GPA or a GVA for which there is no mapping in translation table 135, the I/OMMU can provide an interrupt to interrupt handler 170 indicating that an error has occurred. Interrupt handler 170 can then perform an interrupt service routine to reinitialize I/O device 140, to direct hypervisor 155 to add the mapping to translation table 135, and to reset I/O device 140 to rerun the processing task.

In a particular embodiment, when I/OMMU 130 receives a memory transaction from I/O device 140 that uses a GPA or a GVA for which there is no mapping, the I/OMMU provides an error indication back to the I/O device, rather than to interrupt handler 170. Here, I/O device 140 includes error handler 145 to receive the error indication from I/OMMU 130 and to provide the interrupt to interrupt handler 170. Here, I/O device 140 becomes aware of page translation errors and is configured to gracefully handle them, rather than having I/OMMU 130 provide the interrupt and merely waiting to be reinitialized as in the above embodiment. In this way, manufacturers of I/O devices obtain greater flexibility in the design and configuration of their products, and development of error handling mechanisms can be handled separately from the development path of the manufacturers of the information handling systems, operating systems, and other participants in the development of information handling system 100.

Figure 2:
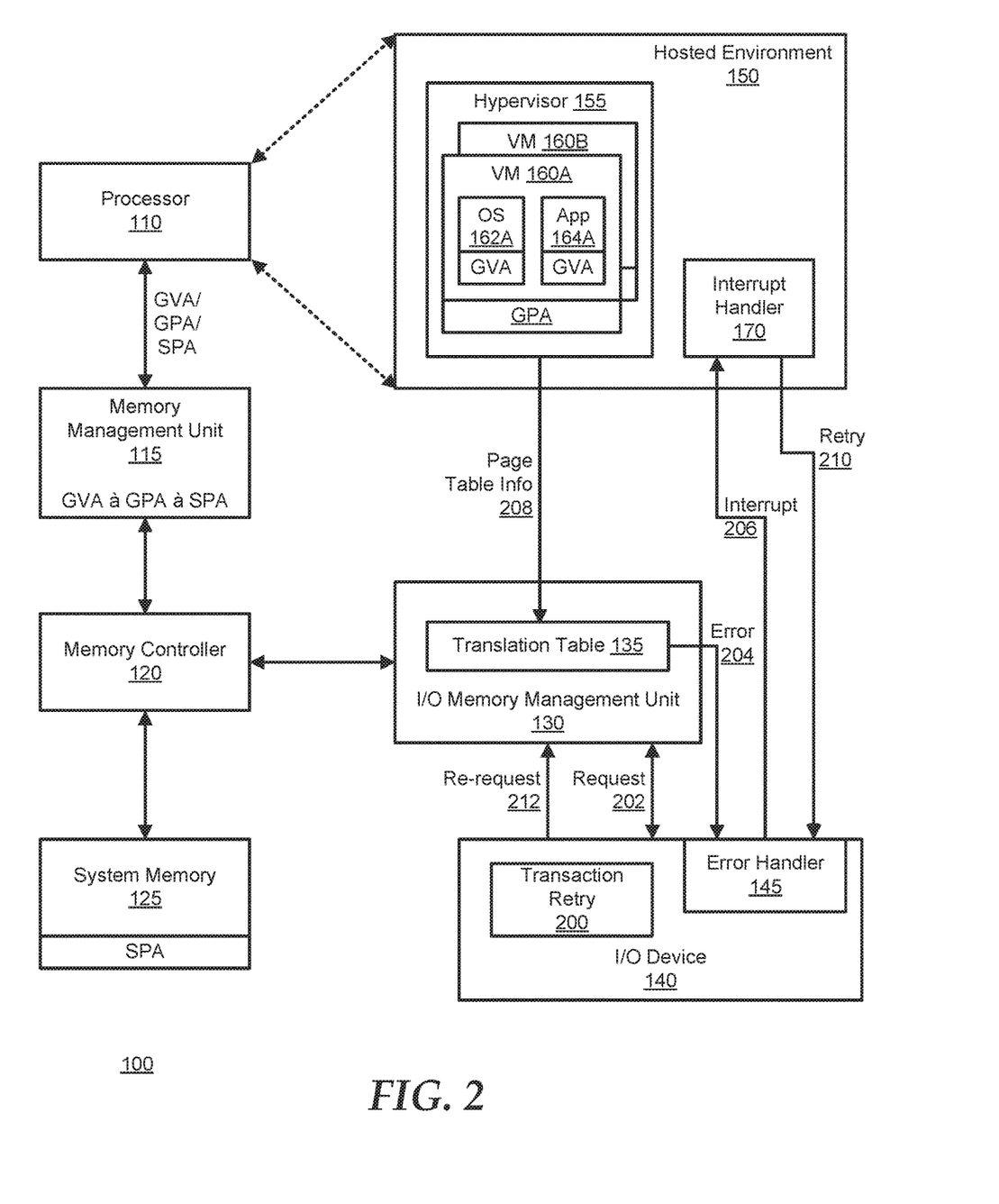
FIGS. 2 and 3 illustrate methods of handling I/O page table misses in the information handling system of FIG. 1.

FIG. 2 illustrates a method of handling an I/O page table miss in information handling system 100. I/O device 140 issues a memory transaction request 202 to I/OMMU 130 to a GPA or a GVA for which there is no resident translation in translation table 135. I/OMMU 130 detects the memory translation error and provides an error signal 204 to I/O device 140 indicating that the requested memory transaction request could not be serviced. Error signal 204 can represent a hardware signal between I/OMMU 130 and I/O device 140, or can be a signal sent via the interface to the I/O device, as needed or desired. When I/O device 140 receives error signal 204, the transaction request is posted to a transaction retry register 200 and an interrupt 206 is provided by error handler 145 to interrupt handler 170. Here, when interrupt handler 145 receives interrupt 206, the invoked interrupt service routine directs hypervisor 155 to provide the page table information 208 to translation table 135, and returns a retry signal 210 to error handler 145. When error handler 145 receives retry signal 210, I/O device re-issues the memory transaction request 212 to I/OMMU 135, and the request is serviced by the I/OMMU.

Figure 3:
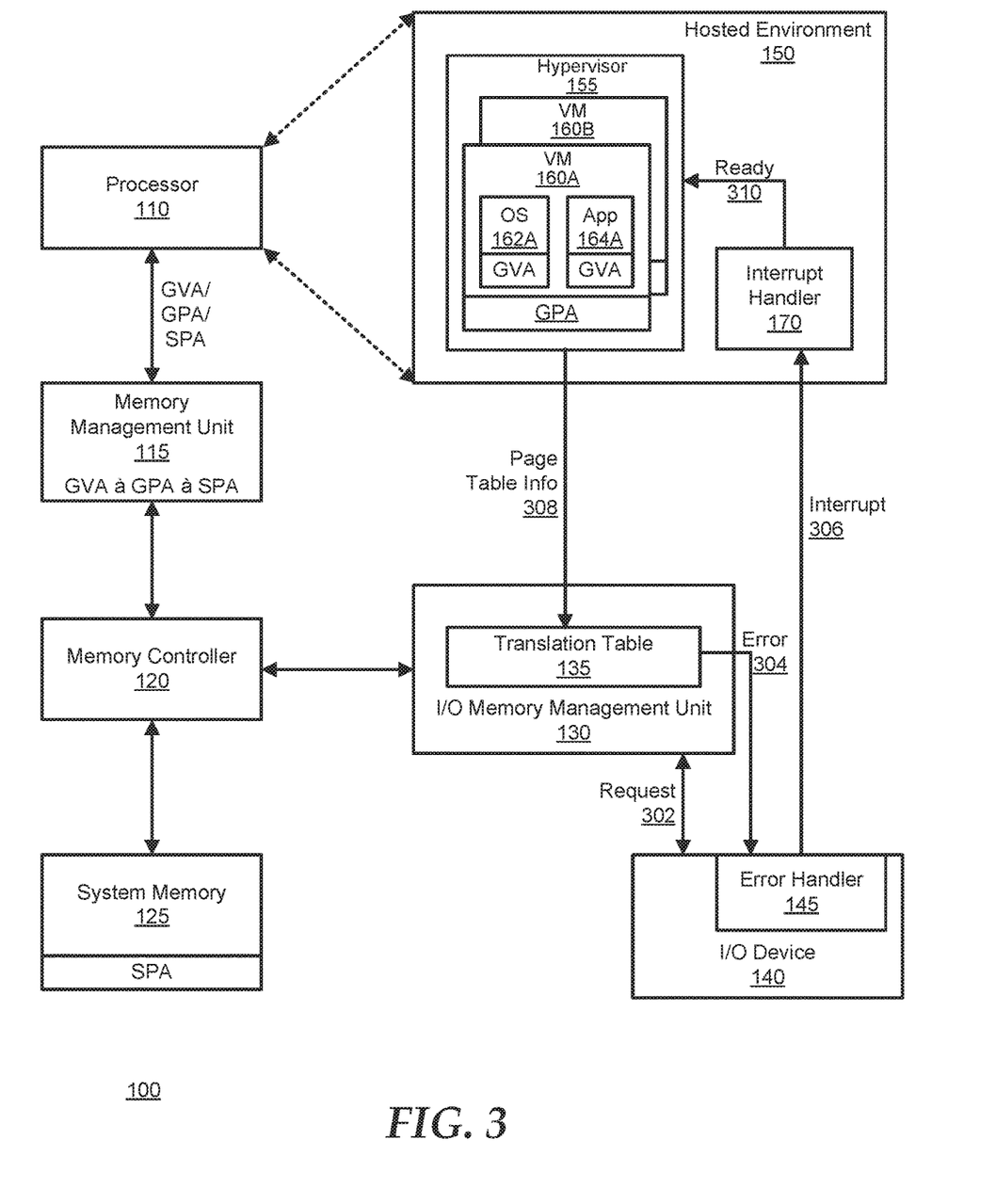

FIG. 3 illustrates another method of handling an I/O page table miss in information handling system 100. I/O device 140 issues a memory transaction request 302 to I/OMMU 130 to a GPA or a GVA for which there is no resident translation in translation table 135. I/OMMU 130 detects the memory translation error and provides an error signal 304 to I/O device 140 indicating that the requested memory transaction request could not be serviced. Error signal 304 can represent a hardware signal between I/OMMU 130 and I/O device 140, or can be a signal sent via the interface to the I/O device, as needed or desired. Here, I/O device 140 does not include a transaction retry register, but error handler 145 provides an interrupt 306 is provided to interrupt handler 170. Here, when interrupt handler 145 receives interrupt 306, the invoked interrupt service routine directs hypervisor 155 to provide the page table information 308 to translation table 135. However, no retry signal is provided to error handler 145. Instead, here, hypervisor 155 can issue the instructions to I/O device 140 to reperform the I/O function that generated the translation error.

Note that there may be no difference between the I/O device 140 as described with respect to FIG. 2, and the I/O device 140 as described with respect to FIG. 3. In particular, the I/O device as described with respect to FIG. 2 could not only implement the method of FIG. 2, but could also implement the method of FIG. 3. Here, hosted environment 150 may operate in one instance to provide a retry signal to the I/O device, while in other instances may operate to not provide the retry signal. In this say, hosted environment 150 may be flexible to implement policies related to how I/O device 140 is utilized in handling I/O page table misses. In one example, based upon information in interrupt 206, hosted environment 150 can determine to process the interrupt as shown in FIG. 2, while different information in interrupt 306 may prompt hosted environment 150 to process the interrupt as shown in FIG. 3. In another example, hosted environment 150 may handle interrupts from different I/O devices differently. For example, where I/O device 150 represents a storage controller, an interrupt handler configured to issue a retry to the I/O device may be desirable, whereas, where I/O device 150 represents a video controller, the interrupt handler may be configured to not issue a retry for streaming video information.

Figure 4:
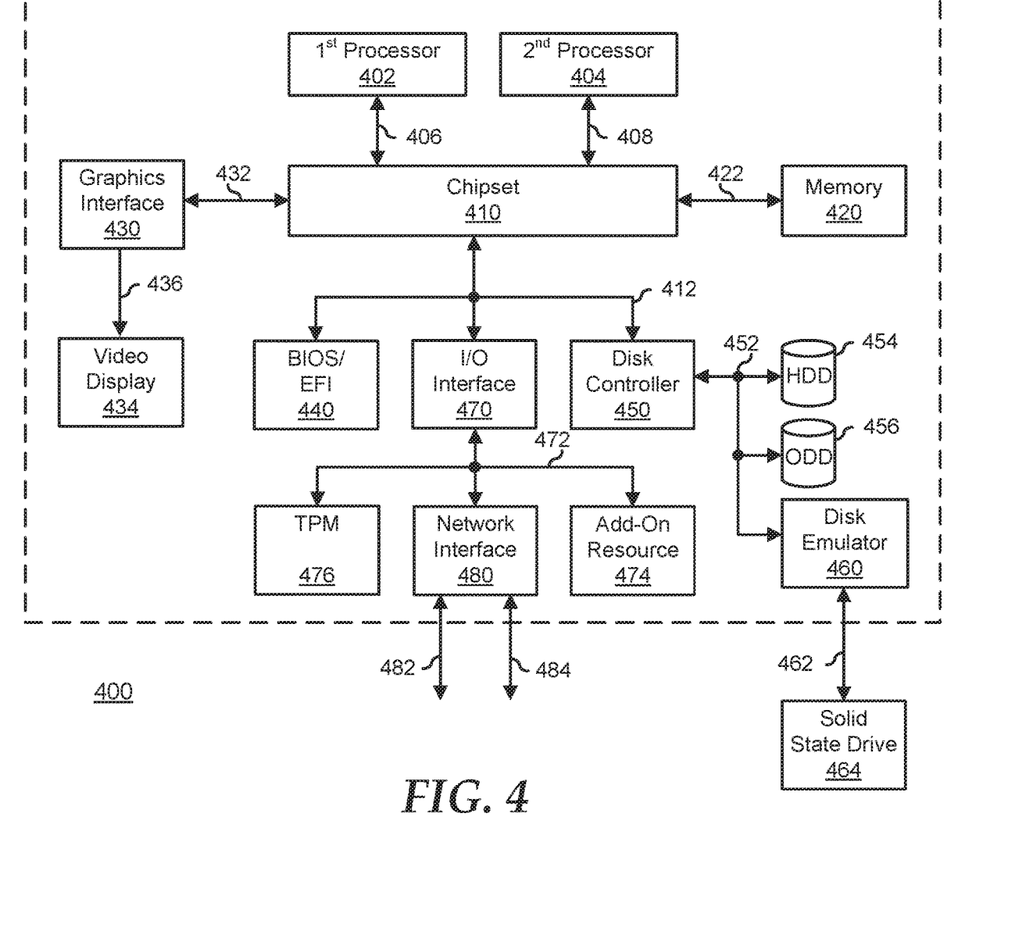
FIG. 4 is a block diagram illustrating a generalized information handling system according to an embodiment of the present disclosure.

FIG. 4 illustrates a generalized embodiment of an information handling system 400 similar to information handling system 100. For purpose of this disclosure information handling system 400 can be configured to provide the features and to perform the functions of the OPF system as described herein. Information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, a chipset 410, a memory 420, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an input/output (I/O) interface 470, one or more add-on resources 474, a trusted platform module (TPM) 476, a network interface 480, a management device 490, and a power supply 495. Processors 402 and 404, chipset 410, memory 420, graphics interface 430, BIOS/UEFI module 440, disk controller 450, HDD 454, ODD 456, disk emulator 460, SSD 462, I/O interface 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NVRAM), or the like, read only memory (ROM), another type of memory, or a combination thereof.

BIOS/UEFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to add-on resource 474, to TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 may include a commercially available BMC product that operates in accordance with an Intelligent Platform Management Initiative (IPMI) specification, such as a Integrated Dell Remote Access Controller (iDRAC), or the like. Management device 490 may further include associated memory devices, logic devices, security devices, or the like, as needed or desired.

Power supply 495 represents one or more devices for power distribution to the components of information handling system 400. In particular, power supply 495 can include a main power supply that receives power from an input power source, such as a wall power outlet, a power strip, a battery, or another power source, as needed or desired. Here, power source 495 operates to convert the power at a first voltage level from the input power source to one or more power rails that are utilized by the components of information handling system. Power supply 495 can also include one or more voltage regulators (VRs) that each receive power from the main power supply and that operate to convert the input voltage to an output voltage that is used by one or more components of information handling system. For example, a VR can be provided for each of processors 402 and 404, and another VR can be provided for memory 420. Power supply 495 can be configured to provide a first power plane that provides power to the host environment, and to provide a second power plane that provides power to the management environment.

Figure 5:
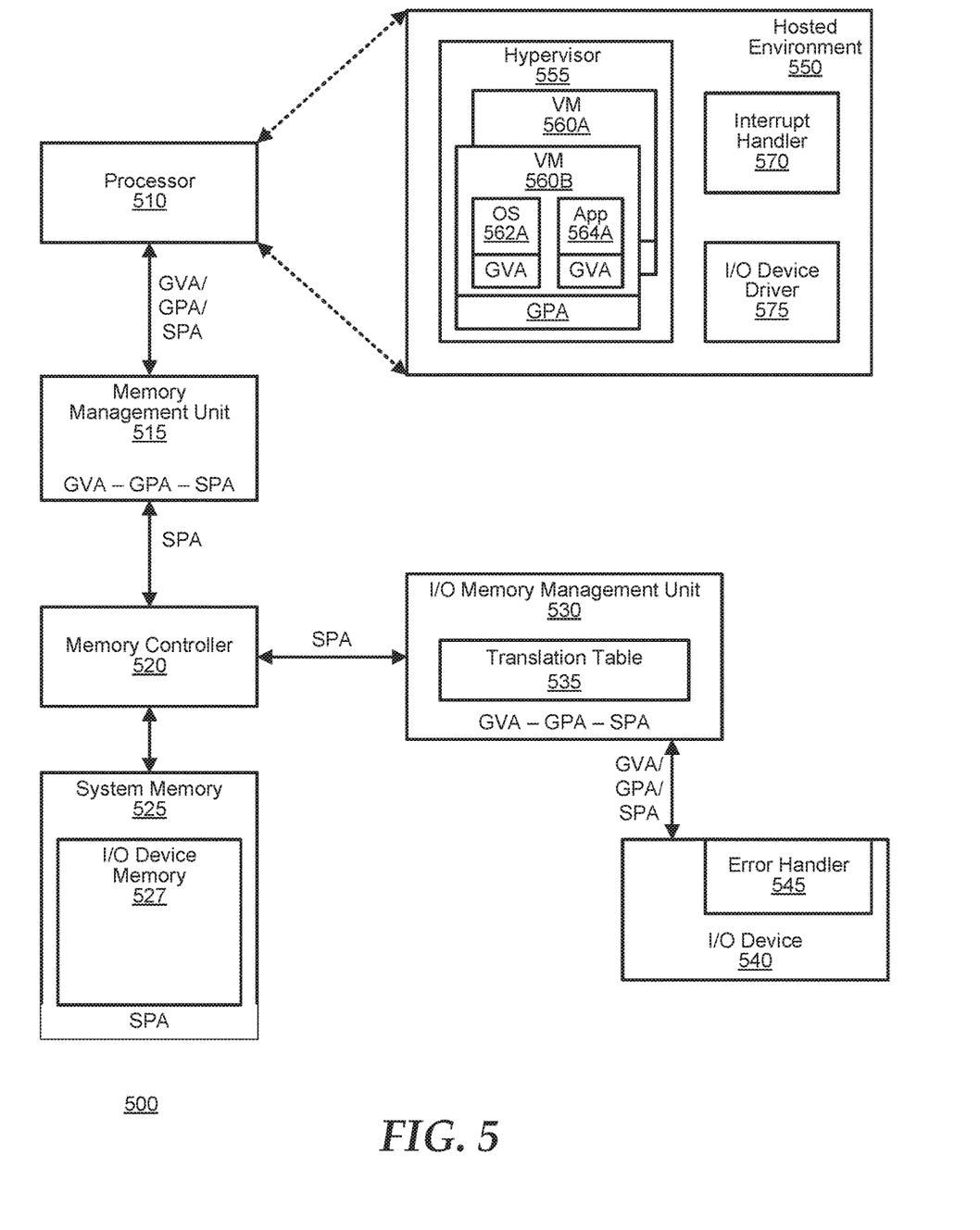
FIG. 5 is a block diagram illustrating an information handling system according to another embodiment of the present disclosure.

FIG. 5 illustrates an information handling system 500 similar to information handling system 100, and including a processor 510, a memory management unit (MMU) 515, a memory controller 520, a system memory 525, an input/output memory management unit (I/OMMU) 530, and an I/O device 540. Processor 510 operates similarly to processor 110 to execute machine-readable code to instantiate a hosted environment 550 including a hypervisor 555, an interrupt handler 570, and an I/O device driver 575. Hypervisor 555 operates similarly to hypervisor 155 to instantiate one or more virtual machines (VMs) 560A and 560B, similar to VMs 160A and 160B. Thus each of VMs 560 represent segmented operating environments instantiated in code that provide the functions of an information handling system to an end user of the VM, but that utilize the hardware resources of information handling system 500, and the VMs each operate to run a virtual operating system (OS) 562 that can launch one or more applications 564. Thus, information handling system 500 includes system memory 525 that provides a SPA space that is defined by the physical characteristics of the information handling system, and VMs 560 each include a GPA space that is defined by the configuration of the particular VM, and memory addressing within the VMs may be based upon a GVA space.

Hypervisor 555 operates to manage each of VMs 560 in terms of usage and allocation of system memory 525 and I/O device 540. As such, hypervisor 555 may operate to translate each of VMs 560 GVA- and GPA-based transaction into associated SPA-based transactions that are targeted to the separate areas of system memory 525, or the hypervisor 555 may set up and maintains a translation table in MMU 515 that permits the MMU to perform the translations between VMs' 560 GVA- and GPA-based transactions, thereby freeing processor 510 from having to perform the processing steps to do the translations. In either case, MMU 515 provides only SPA-based transactions to memory controller 520.

I/O device 540 represents a resource of information handling system 500 similar to I/O device 140, that is accessed via particular I/O interfaces of the information handling system, and that accesses system memory 525 to perform various processing functions of the information handling system. In particular, I/O device 540 operates to provide various DMA operations between resources of the I/O device and system memory 525. As such, hypervisor 555, VMs 560, OS 562, application 564, or other elements of hosted environment 550 may operate to access I/O device 540 via the I/O interface to set up a processing task. The processing task may be based upon data stored in system memory 525 or may store data resulting from the processing task to the system memory, as needed or desired. After the processing task is set up, processor 510 is no longer needed to provide data processing functions to I/O device 540 in order to perform the processing task.

I/O device 540 is virtualizable, and may provide memory transactions that are associated with VMs 560, with OS 562, or with application 564. Thus, a memory transaction provided by I/O device 540 may be addressed with a GVA, with a GPA, or with a SPA. As with memory transactions from hosted environment 550, as described above, hypervisor 555 may operate to translate the GVA- and GPA-based memory transactions from I/O device 540, but with the same overhead usage of processor 510, or the hypervisor 555 may set up and maintain a translation table 535 in I/OMMU 530 that permits the I/OMMU to perform the translations between the GVA- and GPA-based transactions from I/O device 540, thereby freeing processor 510 from having to perform the processing steps to do the translations. As such, I/OMMU 530 provides only SPA-based transactions to memory controller 520.

Typically, when hypervisor 555 instantiates one of VMs 560, the hypervisor creates the GPA-to-SPA mappings, and stores the GPA-to-SPA mapping to translation table 535. Similarly, when one of VMs 560 launches OS 562 or applications 564, hypervisor 555 allocates creates the GVA-to-SPA mappings, and stores the GVA-to-SPA mapping to translation table 535. In a particular embodiment, when hypervisor 555 stores a GPA-to-SPA mapping or a GVA-to-SPA mapping to translation table 535, the hypervisor also pins the mapping. As such, when I/OMMU 530 receives a memory transaction that uses a GPA or a GVA for which there is no mapping, the I/OMMU can indicate to hosted environment 550 that an error has occurred, and the hosted environment can take steps to reinitialize I/O device 540, to add the mapping to translation table 535, to reset I/O device 540 to rerun the processing task, or to otherwise mitigate the translation table miss.

As noted above, as the use of virtualization technology has increased, the use of pinning of all GPA- and GVA-based memory translations to translation table 535 is becoming less pervasive, and the use of unpinned GPA- and GVA-based mappings is increasing, and the likelihood of a translation miss increases, as does the likelihood that the processing overhead expended by processor 510 to resolve the misses. In a particular embodiment, interrupt handler 570 operates similarly to interrupt handler 170, as described above.

Interrupt handler 570 is similar to interrupt handler 170, representing code within hosted environment 550 that provides various interrupt service routines to handle events within information handling system 500. When a particular event is detected, the detector issues an interrupt to processor 510, and the processor jumps code execution to the associated interrupt service routine to deal with the event. Interrupt handler 570 may represent separate firmware code stored in a secure storage of information handling system 500 to prevent tampering with the interrupt handling routines of the information handling system. An example of an interrupt that can be handled by interrupt handler 570 includes the translation table miss in I/OMMU 530 as described above. Here, when I/OMMU 530 receives a memory transaction from I/O device 540 that uses a GPA or a GVA for which there is no mapping in translation table 535, the I/OMMU can provide an interrupt to interrupt handler 570 indicating that an error has occurred. Interrupt handler 570 can then perform an interrupt service routine to reinitialize I/O device 540, to direct hypervisor 555 to add the mapping to translation table 535, and to reset I/O device 540 to rerun the processing task.

I/O device driver 575 represents code within hosted environment 550 that operates to control I/O device 540, providing an interface through which hypervisor 556, a BIOS/UFEI of information handling system 500, or another element accesses the functions and features of the I/O device. In particular, when an element of information handling system 500 calls I/O device river 575 to access a function or feature of I/O device 540, the I/O device driver issues commands to the I/O device. When I/O device 540 responds to the commands, I/O device driver 575 operates to invoke routines in the element of information handling system 500 that called the I/O device driver. I/O device driver 575 further provides a separate interrupt handling path for I/O device 540, particularly to handle asynchronous time-dependent events on the I/O device. Thus, when I/O device 540 detects and event that requires the attention of hosted environment 550, the I/O device issues an interrupt to I/O device driver 575 and the I/O device driver invokes a routine to deal with the event. An example of an event that can be handled by I/O device driver 575 includes the translation table miss in I/OMMU 530 as described above. I/O device driver 575 has a dedicated I/O device memory 527 portion allocated from system memory 525. Here, I/O device memory 527 can be allocated to I/O device driver 575 by a system BIOS/UEFI during a system boot process of information handling system 500, can be allocated by hypervisor 555 upon initialization of the hypervisor or upon launching one or more of VMs 560, OSs 562, or applications 564, as needed or desired.

Here, when I/OMMU 530 receives a memory transaction from I/O device 540 that uses a GPA or a GVA for which there is no mapping in translation table 535, the I/OMMU can provide an indication of the error to I/O device driver 575. I/O device driver 575 can then invoke a routine to reinitialize I/O device 540, to add a mapping to translation table 535, and to reset I/O device 540 to rerun the processing task. As such, I/O device 540 includes an error handler 545 to receive the error indication from I/OMMU 530 and to provide the event to I/O device driver 575. Here, I/O device 540 becomes aware of page translation errors and is configured to gracefully handle them, rather than having I/OMMU 530 provide the interrupt and merely waiting to be reinitialized as in the above embodiments. In this way, manufacturers of I/O devices obtain greater flexibility in the design and configuration of their products, and development of error handling mechanisms can be handled separately from the development path of the manufacturers of the information handling systems, operating systems, and other participants in the development of information handling system 500.

Figure 6:
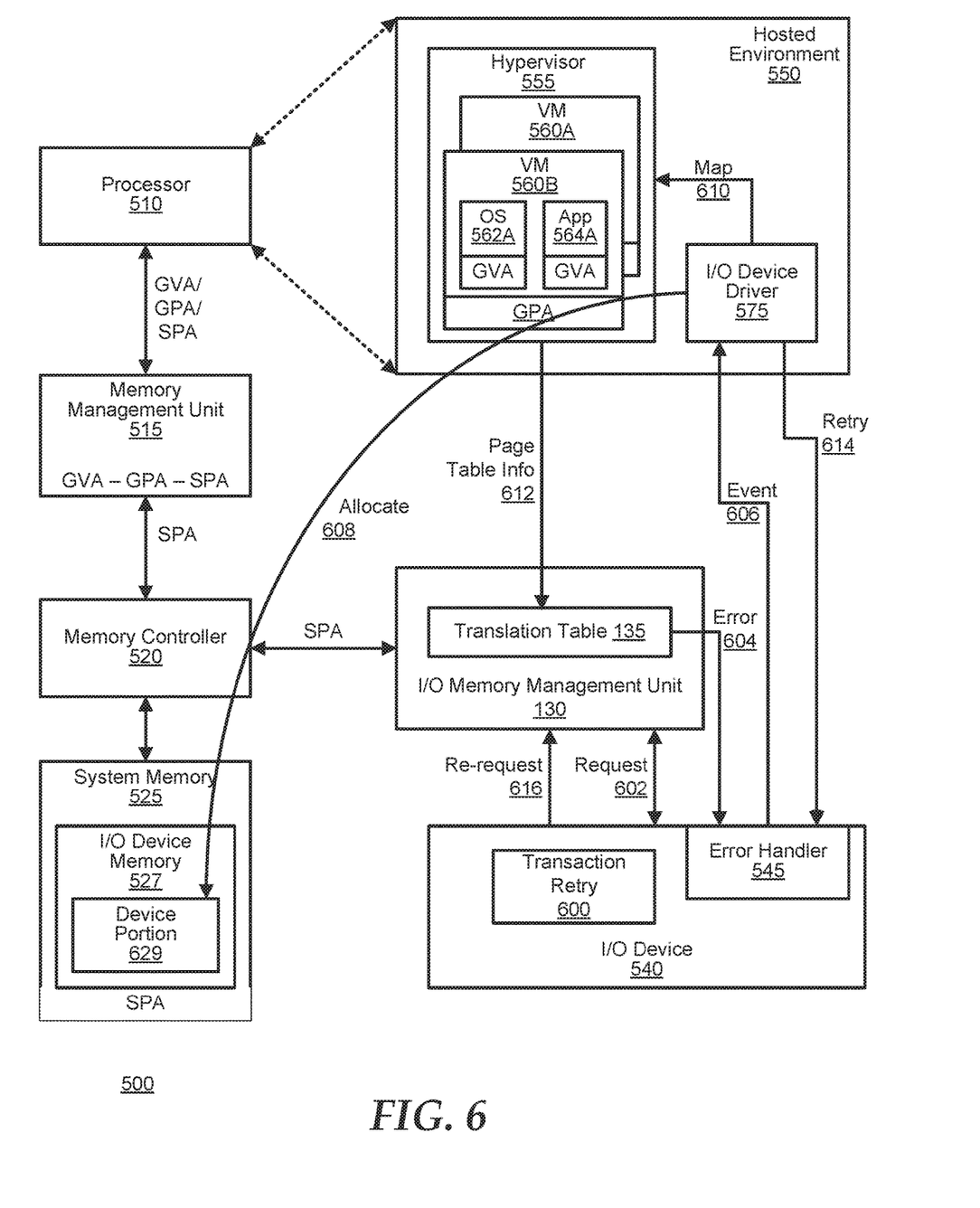
FIGS. 6 and 7 illustrate methods of handling I/O page table misses in the information handling system of FIG. 6.

FIG. 6 illustrates a method of handling an I/O page table miss in information handling system 500. I/O device 540 issues a memory transaction request 602 to I/OMMU 530 to a GPA or a GVA for which there is no resident translation in translation table 535. I/OMMU 530 detects the memory translation error and provides an error signal 604 to I/O device 540 indicating that the requested memory transaction request could not be serviced. Error signal 604 can represent a hardware signal between I/OMMU 530 and I/O device 540, or can be a signal sent via the interface to the I/O device, as needed or desired. When I/O device 540 receives error signal 604, the transaction request is posted to a transaction retry register 600 and an event 606 is provided by error handler 545 to I/O device driver 575. Here, when I/O device driver 575 receives event 606, the I/O device driver allocates 608 a device portion 629 of I/O device memory 527 to service the unmapped event transaction, provides a mapping 610 to hypervisor 555, invokes a routine to direct the hypervisor to provide page table information 612 associated with the portion 629 to translation table 535, and returns a retry signal 614 to error handler 545. When error handler 545 receives retry signal 614, I/O device 540 re-issues the memory transaction request 616 to I/OMMU 535 based upon transaction retry register 600, and the request is serviced by the I/OMMU.

Figure 7:
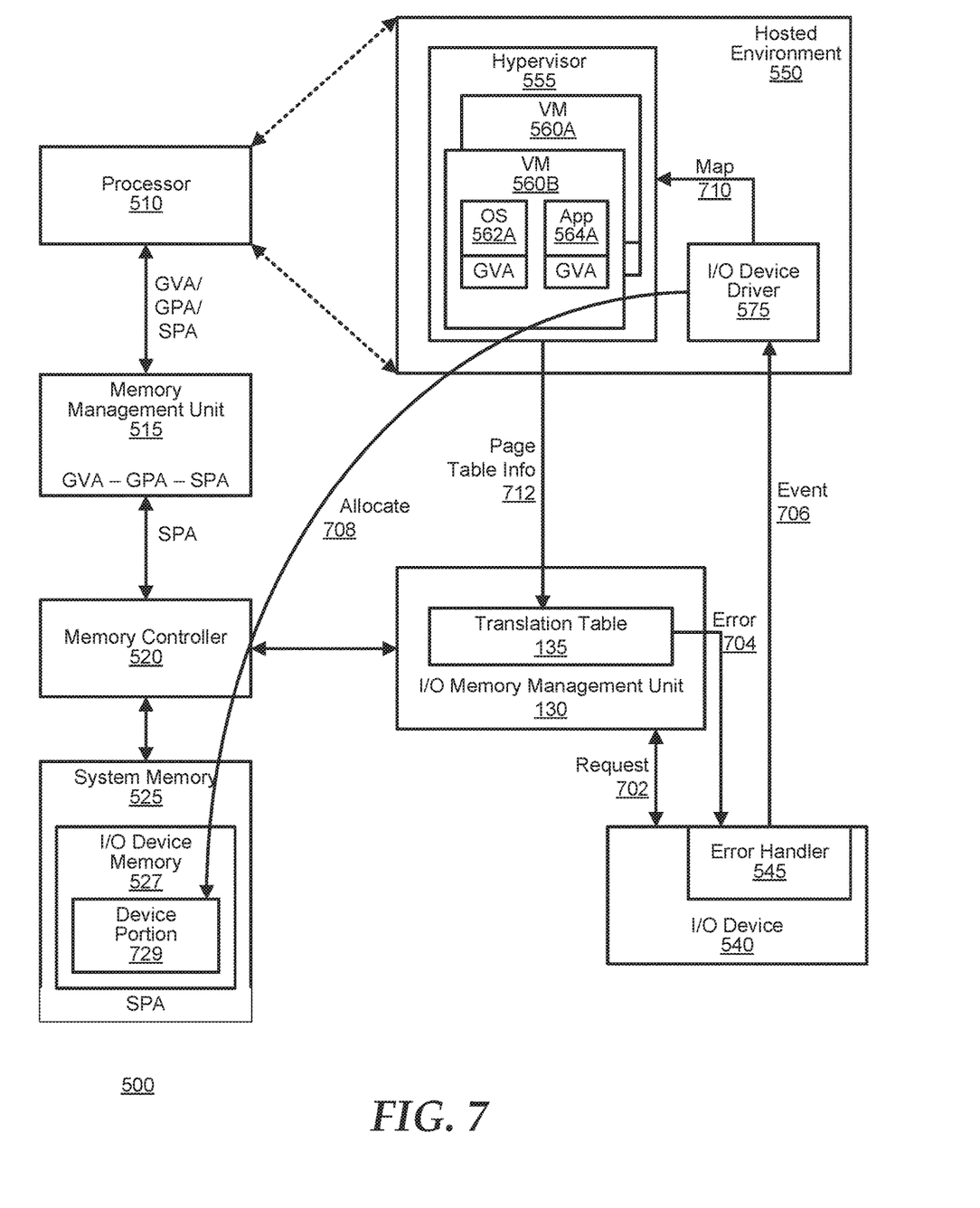

FIG. 7 illustrates another method of handling an I/O page table miss in information handling system 500. I/O device 540 issues a memory transaction request 702 to I/OMMU 530 to a GPA or a GVA for which there is no resident translation in translation table 535. I/OMMU 530 detects the memory translation error and provides an error signal 704 to I/O device 540 indicating that the requested memory transaction request could not be serviced. Error signal 704 can represent a hardware signal between I/OMMU 530 and I/O device 540, or can be a signal sent via the interface to the I/O device, as needed or desired. Here, I/O device 540 does not include a transaction retry register, but error handler 545 provides an event 706 to I/O device driver 575. When I/O device driver 575 receives event 706, the I/O device driver allocates 708 a device portion 729 of I/O device memory 527 to service the unmapped event transaction, provides a mapping 710 to hypervisor 555, and invokes a routine to direct the hypervisor to provide page table information 712 associated with the portion 629 to translation table 535. However, no retry signal is provided to error handler 545. Instead, here, hypervisor 555 can issue the instructions to I/O device 540 to reperform the I/O function that generated the translation error.

Note that there may be no difference between the I/O device 540 as described with respect to FIG. 6, and the I/O device 540 as described with respect to FIG. 7. In particular, the I/O device as described with respect to FIG. 6 could not only implement the method of FIG. 6, but could also implement the method of FIG. 7. Here, hosted environment 550 may operate in one instance to provide a retry signal to the I/O device, while in other instances may operate to not provide the retry signal. In this way, hosted environment 550 may be flexible to implement policies related to how I/O device 540 is utilized in handling I/O page table misses. In one example, based upon information in event 606, hosted environment 550 can determine to process the event as shown in FIG. 6, while different information in event 706 may prompt hosted environment 550 to process the event as shown in FIG. 7. In another example, hosted environment 550 may handle events from different I/O devices differently. For example, where I/O device 550 represents a storage controller, an I/O device driver configured to issue a retry to the I/O device may be desirable, whereas, where I/O device 550 represents a video controller, the I/O device driver may be configured to not issue a retry for streaming video information. It will be further understood that the features and methods as described with respect to FIGS. 1-3 are not incompatible with the features and methods as described with respect to FIGS. 5-7, and that error events can be handled in one instance by an interrupt handler, while a different error event can be handled by an I/O device driver, as needed or desired. Moreover, it will be understood that, in interacting with hosted environment 550, and particularly with hypervisor 555, I/O device driver 575 may operate to provide one or more interrupts to interrupt handler 570. Here, interrupt handler 570 will be understood to invoke the various routines needed to perform the functions and features as described herein.

However, utilizing an I/O device driver to handle page translation errors instead of an interrupt handler may provide benefits to the overall processing performance of the information handling system. For example, because the I/O driver merely needs to allocate a portion of its own allocation of system memory to the purpose of handling the page translation miss, the I/O driver can quickly decide on a location to service the stalled transaction. Typically, a page translation miss necessitates a long process where the hypervisor first determines the VM/OS/application associated with the transaction, then determines where the portion of system memory is that is allocated to the associated VM/OS/application. In a dense computing environment, this may not be a trivial process. Here, the I/O device driver only needs to ensure that the portion of the I/O device memory that is allocated to the transaction does not contend with other uses of the I/O device memory, a determination that is completely within the control of the I/O device driver. Upon determining the new mapping, the I/O device driver then merely needs to inform the hypervisor of the result, and to request that the hypervisor create the new mapping in the translation table.

Figure 8:
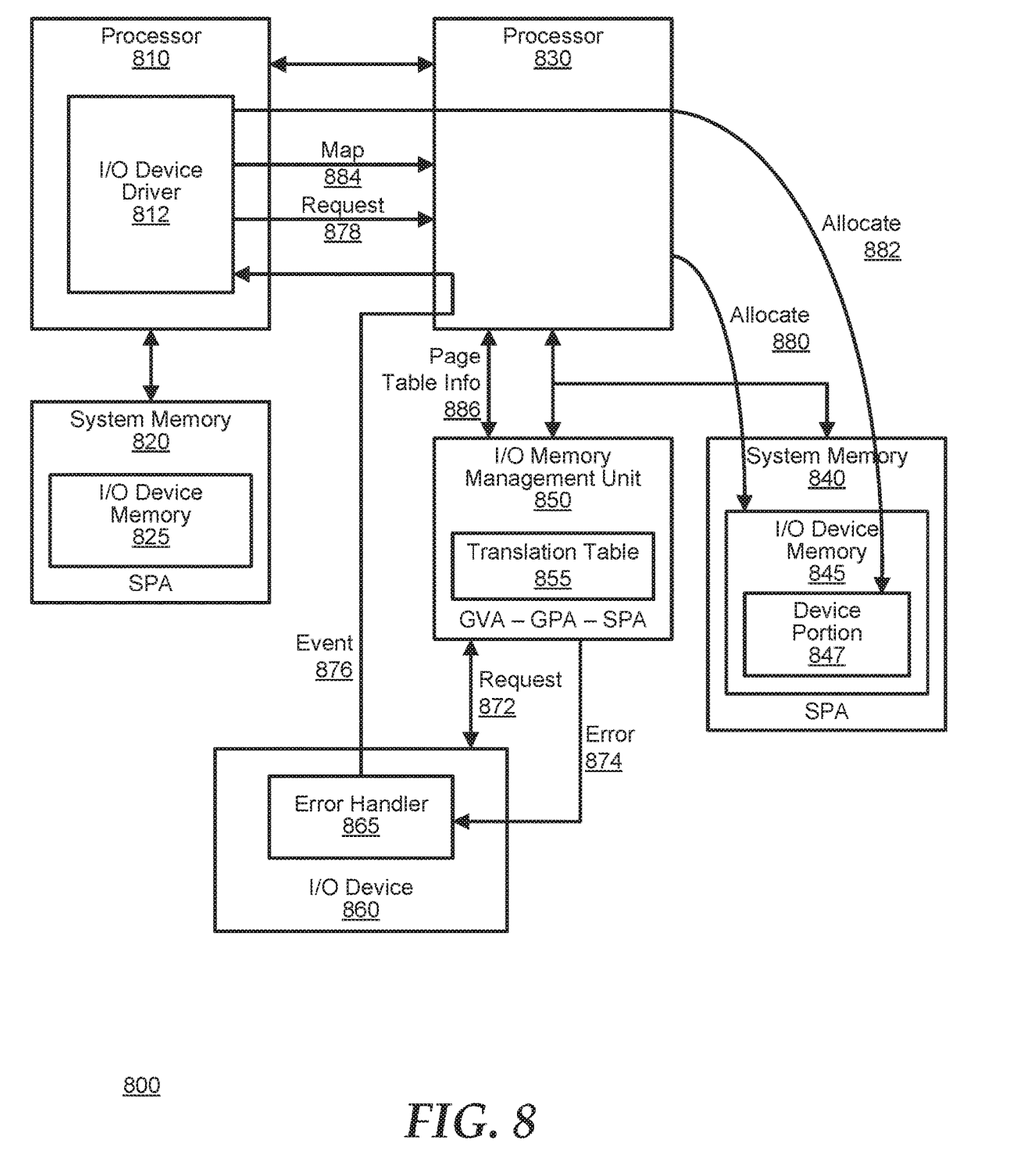
FIG. 8 is a block diagram illustrating an information handling system according to another embodiment of the present disclosure.

FIG. 8 illustrates an information handling system 8100 including a processor 810, a memory system 820, a second processor 830, a second memory system 840, an I/OMMU 850, and an I/O device 860. System memory 820 represents memory devices that are allocated to the use of processor 810, and system memory 840 represents memory devices that are allocated to the use of processor 830, such as in system architectures that provide dedicated system memory to the use of each processor in a multi-processor system. Processors 810 and 830 operate to execute machine-readable code to instantiate a hosted environment including a hypervisor. Processor 810 instantiates an I/O device driver 812 associated with I/O device 860, and the I/O device driver has an I/O device memory 825 portion of system memory 820 allocated to the use of the I/O device driver. It will be understood that, as initially configured, such as during a system boot process for information handling system 800, system memory 840 does not include an I/O device memory, such as I/O device memory 845, as illustrated, but that the illustrated I/O device memory 845 and portion 847 of I/O device memory 845 are instantiated on system memory 840 as a result of the method as described further below. It will be understood that the hypervisor may be instantiated on one of processors 810 and 830, or parts of the hypervisor may be instantiated on each of the processors, as needed or desired. The hypervisor operates on information handling system 800 to instantiate one or more VMs. The VMs each operate to run a virtual OS that can launch one or more applications. Thus, where information handling system 800 includes system memories 820 and 840 that each provide a SPA space that is defined by the physical characteristics of the information handling system, the VMs each include a GPA space that is defined by the configuration of the particular VM, and that memory addressing within the VMs may be based upon a GVA space.

The hypervisor operates to manage each of the VMs in terms of usage and allocation of system memories 820 and 840 and I/O device 860. In particular, it will be noted that, within the confines of the VMs, various memory and I/O operations my result in no contentions within each VMs' own the GVA space or GPA space. However, the mapping of each of the VMs' own GVA space and GPA space must be maintained in separate areas within SPA space of system memories 820 and 840 in order to avoid memory contentions between the VMs. As such, the hypervisor may operate to translate each of the VMs GVA- and GPA-based transaction into associated SPA-based transactions that are targeted to the separate areas of system memories 820 and 840, however, as noted above with respect to information handling systems 100 and 500, this method invokes processors 810 and 830 to perform the memory translations. In a particular embodiment, the hypervisor sets up and maintains a translation table in an MMU that permits the MMU to perform the translations between the VMs' GVA- and GPA-based transactions, thereby freeing processors 810 and 830 from having to perform the processing steps to do the translations. In either case, the MMU provides only SPA-based transactions to system memories 820 and 840. It will be understood that each of processors 810 and 830 may include their own associated MMU, as needed or desired.

I/O device 860 is similar to I/O devices 140 and 540 and represents a resource of information handling system 800 that is accessed via a particular I/O interface of the information handling system, and that accesses system memories 820 and 840 to perform various processing functions of the information handling system. In particular, I/O device 860 operates to provide various direct memory access (DMA) operations between resources of the I/O device and system memories 820 and 840. As such, the hypervisor, the VMs, the OSs, the applications, or other elements of a hosted environment may operate to access I/O device 86 via the I/O interface to set up a processing task. The processing task may be based upon data stored in system memories 820 and 840 or may store data resulting from the processing task to other system memory, as needed or desired. After the processing task is set up, processors 810 and 830 are no longer needed to provide data processing functions to I/O device 860 in order to perform the processing task.

I/O device driver 812 represents code within the hosted environment that operates to control I/O device 860, providing an interface through which the hypervisor, a BIOS/UFEI of information handling system 800, or another element accesses the functions and features of the I/O device. In particular, when an element of information handling system 800 calls I/O device river 812 to access a function or feature of I/O device 860, the I/O device driver issues commands to the I/O device. When I/O device 860 responds to the commands, I/O device driver 812 operates to invoke routines in the element of information handling system 800 that called the I/O device driver. I/O device driver 812 further provides a separate interrupt handling path for I/O device 860, particularly to handle asynchronous time-dependent events on the I/O device. Thus, when I/O device 860 detects and event that requires the attention of the hosted environment, the I/O device issues an interrupt to I/O device driver 812 and the I/O device driver invokes a routine to deal with the event. An example of an event that can be handled by I/O device driver 812 includes the translation table miss in I/OMMU 850 as described above. I/O device driver 812 has a dedicated I/O device memory 825 portion allocated from system memory 820. Here, I/O device memory 825 can be allocated to I/O device driver 812 by a system BIOS/UEFI during a system boot process of information handling system 800, can be allocated by the hypervisor upon initialization of the hypervisor or upon launching one or more of the VMs, the OSs, or the applications, as needed or desired.

Here, when I/OMMU 850 receives a memory transaction from I/O device 860 that uses a GPA or a GVA for which there is no mapping in translation table 855, the I/OMMU can provide an indication of the error to I/O device driver 812. I/O device driver 812 can then invoke a routine to reinitialize I/O device 860, to add a mapping to translation table 835, and to reset I/O device 860 to rerun the processing task. As such, I/O device 860 includes an error handler 865 to receive the error indication from I/OMMU 850 and to provide the event to I/O device driver 812. Here, I/O device 812 becomes aware of page translation errors and is configured to gracefully handle them, rather than having I/OMMU 850 provide the interrupt and merely waiting to be reinitialized as in the above embodiments. Here, because I/O device 860 is architecturally more closely associated with processor 830, the mapping of a page translation error into I/O device memory 845 in system memory 840 results in improved system performance on information handling system 800, over a mapping to the original I/O device memory 825 because the I/O transactions do not need to traverse the inter-processor communication link>Hence the current and all future transactions to the particular missed memory page will be performed locally to processor 830.

I/O device 860 is virtualizable, in that the resources, functions, and features of the I/O device may be allocated to the VMs by the hypervisor. In particular, I/O device 860 may provide memory transactions that are associated with the VMs, with the OSs, or with the applications. Thus, a memory transaction provided by I/O device 860 may be addressed with a GVA, with a GPA, or with a SPA. As with memory transactions from the hosted environment, as described above, the hypervisor may operate to translate the GVA- and GPA-based memory transactions from I/O device 860, but with the same overhead usage of processors 810 and 830. In a particular embodiment, the hypervisor sets up and maintains a translation table 855 in I/OMMU 850 that permits the I/OMMU to perform the translations between the GVA- and GPA-based transactions from I/O device 860, thereby freeing processors 810 and 830 from having to perform the processing steps to do the translations. As such, I/OMMU 850 provides only SPA-based transactions to system memories 820 and 840.

Typically, when the hypervisor instantiates one of the VMs, the hypervisor allocates one or more portion of system memories 820 and 840 to the VM, thereby creating a GPA-to-SPA mapping, and stores the GPA-to-SPA mapping to translation table 855. Similarly, when one of the VMs launches an OS or an applications, the hypervisor allocates one or more portion of the memory allocated to the VM to the OS or application, thereby creating a GVA-to-SPA mapping, and stores the GVA-to-SPA mapping to translation table 855. In the mappings in translation table 855 can be pinned or unpinned. When I/OMMU 850 receives a memory transaction that uses a GPA or a GVA for which there is no mapping, the I/OMMU can indicate to I/O device driver 812 that an error has occurred, and the hosted environment can take steps to reinitialize I/O device 860, to add the mapping to translation table 855, to reset I/O device 860 to rerun the processing task, or to otherwise mitigate the translation table miss.

FIG. 8 further illustrates a method of handling an I/O page table miss in information handling system 800. I/O device 860 issues a memory transaction request 872 to I/OMMU 850 to a GPA or a GVA for which there is no resident translation in translation table 855. I/OMMU 850 detects the memory translation error and provides an error signal 874 to I/O device 860 indicating that the requested memory transaction request could not be serviced. Error signal 874 can represent a hardware signal between I/OMMU 850 and I/O device 860, or can be a signal sent via the interface to the I/O device, as needed or desired. Error handler 865 provides an event 876 to I/O device driver 823. Note that event 876 is handled via processor 830 before being forwarded to processor 810. When I/O device driver 812 receives event 876, the I/O device driver requests 878 an allocation of memory associated with processor 830, and the processor allocates 880 I/O device memory 845 within system memory 840. I/O device driver 812 then allocates 882 a device portion 847 of I/O device memory 845 to service the unmapped event transaction, provides a mapping 884 to the hypervisor, and invokes a routine to direct the hypervisor to provide page table information 886 associated with the portion 847 to translation table 855. If I/O device 860 includes a retry buffer, then I/O device driver 812 can issue a retry to the I/O device. Otherwise the hypervisor can issue the instructions to I/O device 860 to reperform the I/O function that generated the translation error.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor;
   an input/output (I/O) device that is controlled by the processor via an I/O device driver;
   a memory device, wherein a portion of a system physical address (SPA) space of the memory device is allocated to the I/O device driver; and an input/output memory management unit (I/OMMU) configured to translate virtual addresses from the I/O device to physical addresses in the SPA space;

wherein the I/O device is configured to send a first virtual address to the I/OMMU, to receive a page fault indication from the I/OMMU, and to send an error indication to the I/O device driver in response to the page fault indication, wherein the error indication indicates that the I/OMMU failed to translate the first virtual address into a first physical address; and wherein, in response to receiving the error indication, the I/O device driver is configured to allocate a sub-portion of the portion of the SPA space to the I/O device, and to send a page table translation to the I/OMMU, the page table translation mapping the first virtual address into a second physical address within the sub-portion.

2. The information handling system of claim 1, wherein in sending the page table translation to the I/OMMU, the I/O device driver is further configured to send the page table translation to a hypervisor instantiated on the information handling system.

3. The information handling system of claim 2, further comprising:
an interrupt handler, wherein in sending the page table translation to the I/OMMU, the I/O device driver is further configured to issue an interrupt to the interrupt handler, the interrupt including the page table translation.

4. The information handling system of claim 1, wherein the I/OMMU includes a translation table.

5. The information handling system of claim 4, wherein the I/OMMU is further configured to receive the first virtual address, to compare the first virtual address with entries in the translation table, and to determine that the translation table includes no entry associated with the first virtual address.

6. The information handling system of claim 1, wherein the I/O device includes a transaction retry register, and wherein the I/O device is further configured to store a first transaction associated with the first virtual address to the transaction retry register in response to receiving the error indication.

7. The information handling system of claim 6, wherein the I/O device driver is further configured to send a retry indication to the I/O device in response to providing the page table translation to the I/OMMU.

8. The information handling system of claim 7, wherein the I/O device is further configured to provide the first virtual address to the I/OMMU from the transaction retry register in response to receiving the retry indication.

9. The information handling system of claim 1, wherein the interrupt is a Message Signaled Interrupt-X.

10. A method, comprising:
allocating a portion of a system physical address (SPA) space of a memory device of an information handling system to an input/output (I/O) device driver, wherein a processor of the information handling system is configured to control an I/O device of the information handling system via the I/O device driver;

sending, from the I/O device of the information handling system, to an I/O memory management unit (I/OMMU) of the information handling system, a virtual address, wherein the I/OMMU is configured to translate virtual addresses from the I/O device to physical addresses in a memory of the information handling system;

receiving, by the I/O device, a page fault indication from the I/OMMU, wherein the page fault indication indicates that the I/OMMU failed to translate the first virtual address into a first physical address;

sending, from the I/O device, an error indication to an I/O device driver instantiated on the information handling system in response to the page fault indication, wherein the processor of the information handling system controls the I/O device via the I/O device driver;

allocating, by the I/O device driver, a sub-portion of the portion of the SPA space to the I/O device in response to receiving the error indication; and sending, by the I/O device driver, a page table translation to the I/OMMU, the page table translation mapping the first virtual address into a second physical address within the sub-portion.

11. The method of claim 10, wherein in sending the page table translation to the I/OMMU, the method further comprises:
sending, by the I/O device driver, the page table translation to a hypervisor instantiated on the information handling system.

12. The method of claim 11, wherein in sending the page table translation to the I/OMMU, the method further comprises:
sending, by the I/O device driver, an interrupt to an interrupt handler of the information handling system, the interrupt including the page table translation.

13. The method of claim 10, wherein the I/OMMU includes a translation table.

14. The method of claim 13, further comprising:
receiving, by the I/OMMU, the virtual address;
comparing, by the I/O device, the virtual address with entries in the translation table; and
determining, by the I/O device, that the translation table includes no entry associated with the virtual address.

15. The method of claim 10, further comprising:
storing, by the I/O device, a first transaction associated with the first virtual address to a transaction retry register of the I/O device in response to receiving the page fault indication.

16. The method of claim 15, further comprising:
sending, by the I/O device driver, a retry indication to the I/O device in response to providing the translation to the I/OMMU.

17. The method of claim 16, further comprising:
providing, by the I/O device, the first virtual address to the I/OMMU from the transaction retry register in response to receiving the retry indication.

18. The method of claim 10, wherein the interrupt is a Message Signaled Interrupt-X.

19. An information handling system, comprising:
a first processor including a first memory device that is addressable as a first system physical address (SPA) space of the information handling system;

a second processor including a second memory device that is addressable as a second SPA space of the information handling system;

an input/output (I/O) device that is controlled by at least one of the first and second processors via an I/O device driver; and an input/output memory management unit (I/OMMU) configured to translate virtual addresses from the I/O device to physical addresses in a third SPA space of the information handling system, the third SPA space including the first and second SPA spaces;

wherein:
a first portion of the first SPA space is allocated to the I/O device driver;

the I/O device is configured to send a first virtual address to the I/OMMU, to receive a page fault indication from the I/OMMU, and to send an error indication to the I/O device driver in response to the page fault indication, wherein the error indication indicates that the I/OMMU failed to translate the particular first address into a first physical address; and in response to receiving the error indication, the I/O device driver is configured to allocate a second portion of the second SPA space to the I/O device, and to send a page table translation to the I/OMMU, the page table translation mapping the first virtual address into a second physical address within the second portion.

20. The information handling system of claim 19, wherein in sending the page table translation to the I/OMMU, the I/O device driver is further configured to send the page table translation to a hypervisor instantiated on the information handling system.

* * * * *